June 23, 1942. T. G. A. KADER 2,287,312
FOOD KIT
Filed May 31, 1939
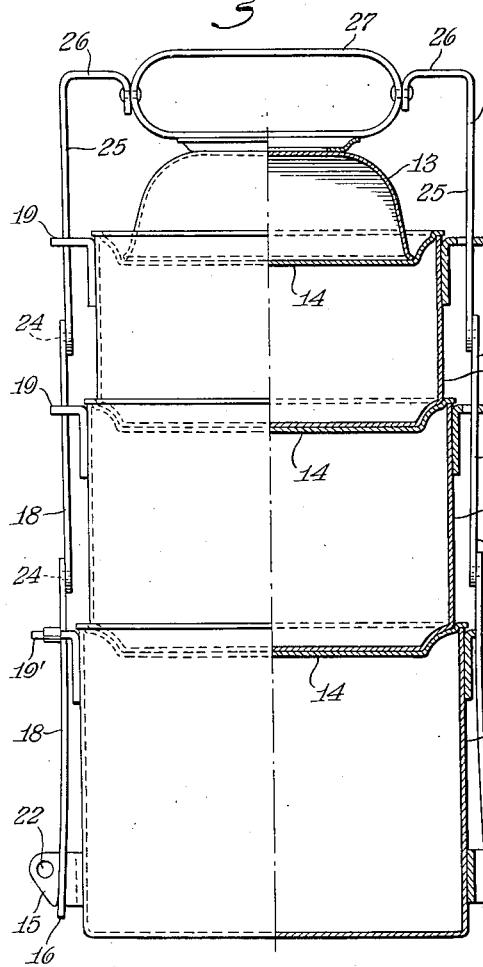
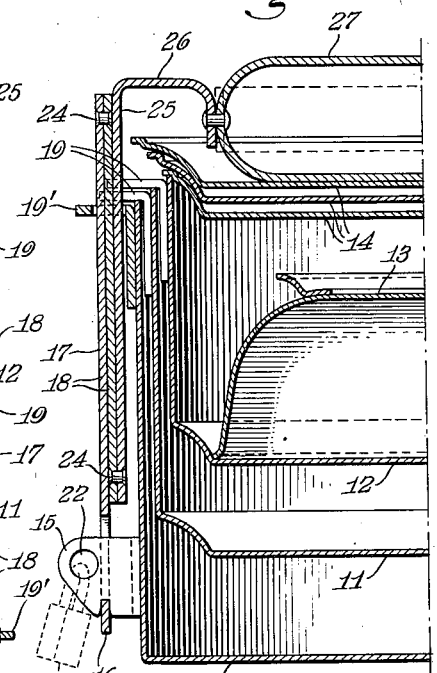
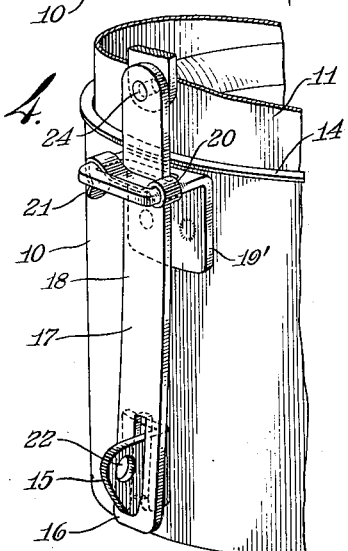
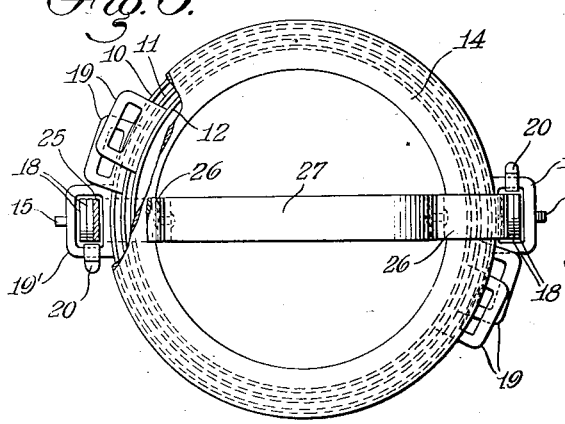
Payegjee G. A. Kader
INVENTOR
By Victor J. Evans & Co.
ATTORNEYS Patented June 23, 1942

2,287,312

UNITED STATES PATENT OFFICE 2,287,312

FOOD KIT

Tayegjee G. A. Kader, Surat, India

Application May 31, 1939, Serial No. 276,745

1 Claim. (Cl. 206—4)

My invention relates to a food kit and more especially to a foldable dinner pail.

The primary object of the invention is the provision of a kit or pail of this character, wherein the same includes a plurality of containers which are in association with plates, these forming covers for the containers when the same are stacked one upon the other and carried as a unit thus enabling food stuff to be transported from one locality to another and served, the kit or pail being serviceable for laborers or persons picnicking, touring or required for the eating of meals in the open or away from home.

Another object of the invention is the provision of a kit or pail of this character, wherein the containers for various food substances when not in use can be conveniently nested and retained in this condition so that such kit or pail can be conveniently carried when empty or when filled with food products, the manner of the carrying of the kit or pail being novel and the construction of such kit or pail is unique.

A further object of the invention is the provision of a kit or pail of this character, wherein cooked or fresh food products can be conveniently stored to have the same separated and also may be conveniently served and when stored therein will be maintained sanitary and without becoming contaminated with dust or dirt and assured of convenient handling both in the carrying and serving of such products.

A still further object of the invention is the provision of a kit or pail of this character, which is simple in construction, reliable and efficient in its purpose, affording separate containers for different foods, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is an elevation, partly in section, of a kit or pail constructed in accordance with the invention.

Figure 2 is a fragmentary vertical longitudinal sectional view thereof showing the containers or receptacles nested one within the other, and means for locking the same therein.

Figure 3 is a top plan view of a device embodying my invention.

Figure 4 is a fragmentary perspective view, illustrating the means for securely conjoining the various compartments embodied by my invention.

Similar reference characters indicate corresponding parts throughout the several views in the drawing.

Referring to the drawing in detail, the kit or pail comprises a group or series of containers or receptacles 10, 11, 12 and 13, respectively, the receptacle 10 being of larger size than the receptacle 11 while the latter is of larger size than the receptacle 12 and the receptacle 13 being smaller than the receptacle 12 and is of bowl formation while the said receptacles 10, 11 and 12 are cylindrical form. These receptacles, in view of the sizes thereof with respect to each other, are susceptible of being nested one within the other, that is to say, the receptacle 11 can fit within the receptacle 10, while the receptacle 12 can fit within the receptacle 11 and the receptacle 13 fits within said receptacle 12 when the kit or pail is collapsed or folded in the manner as shown in Figure 2 of the drawing while in Figure 1 of the drawing the said kit or pail is extended or set up for transportation and the carrying of food. When the kit or pail is set up or collapsed or folded, the receptacle 13 of bowl form is inverted as will be apparent from Figures 1 and 2 of the drawing.

Adapted to fit the open tops of the sections 10, 11 and 12 are serving plates 14, these constituting lids for the said receptacles and seats for the receptacles 11 and 12 when such plates are fitting the receptacles and one receptacle is stacked upon the other or in superimposed relation to each other as is clearly shown in Figure 1 of the drawing. These plates 14 afford food carriers similarly to an ordinary breakfast or dinner plate.

When the kit or pail is set up for use, the foods of different kinds are placed within the sections 10, 11 and 12 while the section 13, when in upright position, constitutes a bowl for liquid food or substance, either soup, coffee, milk or the like. The plates 14 close the receptacles and permit of the stacking of one upon the other and on removal of the plates from lid position when the receptacles are empty the same can be nested one within the other.

On the receptacle 10 at diametrically opposite sides thereof externally of the same are keepers 15 for the fitting therewith of hasp-like ends 16 of a bail 17, the limbs of which are formed in jointed sections 18 so that the said bail can be folded or extended, the limbs being adapted when folded or extended to be carried through yokes or loops 19 arranged at opposite sides of the sections 10, 11 and 12, the extended or folded positions of the bail being shown in Figures 1 and 2 of the drawing and when such bail is folded the sections 10, 11 and 12 nested with each other are retained one within the other thereby while the receptacle 13 is held within the receptacle 12 and the plates 14 are shown nested one within the other and superimposed upon the nested group of said receptacles.

The loops 19' on the receptacle 10 are provided with latch members 20 hingedly secured to one side thereof and adapted to maintain the limbs immovably in place when the said limbs are in extended position. The latches 20 are formed with a snap clip 21 at their outer ends adapted to be snapped over the opposite side of the loop 19' and to be frictionally held thereon. When the limbs 18 are in folded position, the latch members 20 are rotated about the hinged end and permitted to depend therefrom, so that the loop 19' may accommodate the increased number of limbs. The keepers 15 are provided with an opening 22 whereby a lock 23 may be used to prevent any person not authorized to do so from tampering with the various receptacles of said kit.

The sections 18 of the side limbs of the bail 17 are swingingly connected by pivots 24 with each other. The yokes 19 constitute handles when the said sections 10, 11 and 12 are individually handled in the serving of the contents of the same.

When it is desired to place the empty receptacles 10, 11, 12 and 13 in folded position, the upper receptacles 11 and 12 are rotated axially so that the loops 19 are out of vertical alignment with the loops 19' of the receptacle 10 thereby permitting the sections 18 to be received within the loop 19' as best illustrated in Figure 2 of the drawing.

The upper bails 25 are formed with their top portions 26 bent inwardly and downwardly, and are connected transversely of the receptacle 13 by a loop-shaped handle 27.

The handle 27, by virtue of its loop-shaped formation, is essentially resilient in its action to firmly hold all of the receptacles and plates against displacement, the handle firmly engages the bottom of the receptacle 13 when my device is in the extended position, and when the same is in the folded position, it is adapted to be received by the plates or covers 14, constituting a holding means therefor.

What is claimed is:

A kit comprising a plurality of receptacles for interfitting with each other, plates forming covers for said receptacles and seats therefor when superimposed thereon, foldable bails for separable engagement with the receptacles when nested and when seated upon said plates, one of said receptacles being of bowl form, a handle carried by said bail, yoke-like handles on certain of the said receptacles and receiving the bail, clips hingedly secured to certain of said yokes to hold the said bail immovably in place when the receptacles are in superimposed relation and adapted to be disengaged when the said receptacles are in nested relation, and keeper and hasp connections between one of the receptacles and said bail, the said plates being nested with relation to each other when the receptacles are nested one within the other and superimposed thereon and held by said bail.

TAYEGJEE G. A. KADER.